United States Patent [19]
Goodhouse

[11] 3,819,112
[45] June 25, 1974

[54] COOKING COMPUTER MEANS
[75] Inventor: Carl J. Goodhouse, Litchfield, Conn.
[73] Assignee: Robertshaw Controls Company, Richmond, Va.
[22] Filed: Mar. 21, 1972
[21] Appl. No.: 236,753

[52] U.S. Cl. ............ 235/61 A, 235/103, 235/104, 235/132, 219/489, 99/325, 99/332
[51] Int. Cl. ............................................. G01c 1/00
[58] Field of Search ........ 235/61 A, 103, 104, 132; 219/489–493; 236/46; 99/325–333, 339

[56] References Cited
UNITED STATES PATENTS

| | | | |
|---|---|---|---|
| 2,502,220 | 3/1950 | Kaefer et al. | 236/46 D |
| 3,083,272 | 3/1963 | Stolle | 219/493 X |
| 3,244,841 | 4/1966 | Cardes et al. | 236/46 D |
| 3,259,056 | 7/1966 | King | 219/492 X |
| 3,286,924 | 11/1966 | Banathy | 219/493 X |
| 3,353,004 | 11/1967 | Alexander | 219/489 X |
| 3,358,121 | 12/1967 | Bowling | 219/492 X |
| 3,358,924 | 12/1967 | Goodhouse et al. | 219/492 X |
| 3,411,710 | 11/1968 | Willson | 236/460 X |
| 3,688,978 | 9/1972 | Goodhouse et al. | 235/61 A |
| 3,731,059 | 5/1973 | Wilson | 235/61 A |

Primary Examiner—Stephen J. Tomsky
Assistant Examiner—Vit W. Miska
Attorney, Agent, or Firm—Candor, Candor & Tassone

[57] ABSTRACT

A cooking computer for determining the cooking operation of a cooking apparatus, the computer having a stationary input means indicating selectable variables other than the weight of the meat item and having a manually settable weight input means for indicating a single selected indicated weight applicable to all meat items and corresponding to the weight of a particular meat item to be cooked. The weight input means is settable in relation to a selected variable of the stationary input means. The computer has a time period output means operatively associated with the input means to provide as an output, a cooking time period for the particular meat item computed as a function from the selection of both of the input means according to a cooking formula. Both of the input means are so constructed and arranged that when utilized for computing of said cooking time period for a particular meat item, the input means continuously indicates the selected weight and variable for that meat item even after the operation of the time period output means for the computed cooking time period.

10 Claims, 16 Drawing Figures

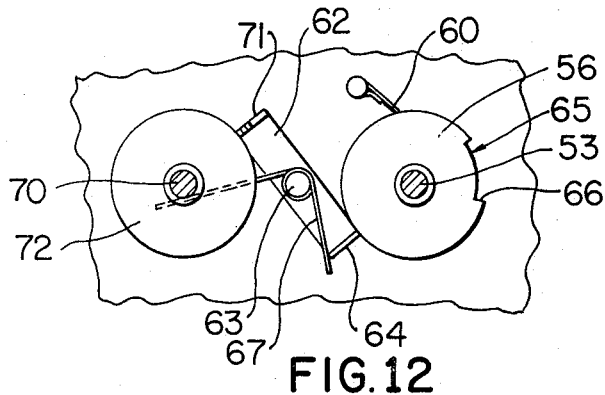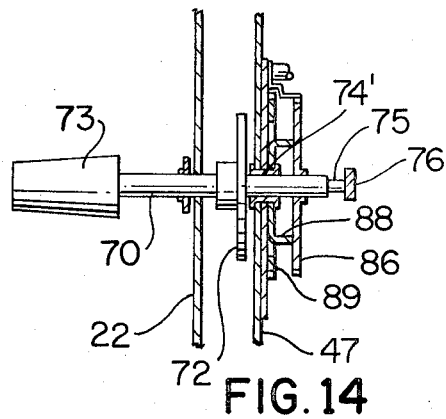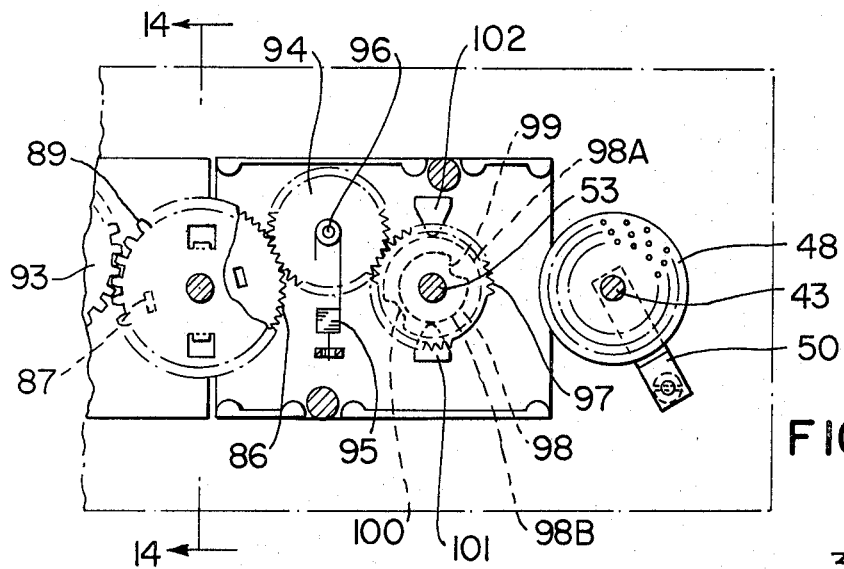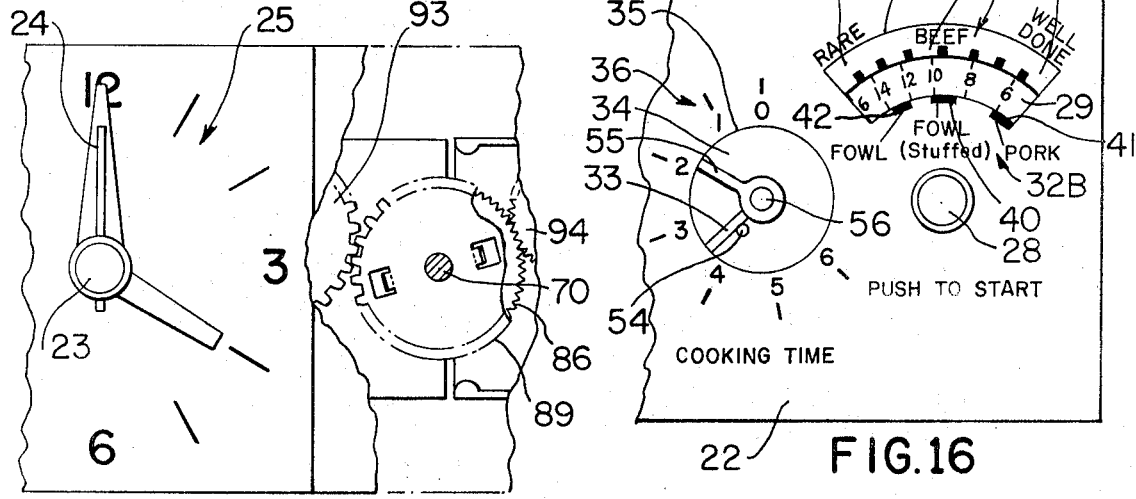

COOKING COMPUTER MEANS

This application relates to a cooking computer means for determining the cooking operation of a cooking apparatus as well as a cooking apparatus having such a computer device or the like.

It is well known from the copending patent application of James R. Willson, Ser. No. 111,727, filed Feb. 1, 1971, that a most accurate cooking of various meat items can be provided by a cooking formula for cooking all types of meats by utilizing only two variables, namely, the weight of a particular meat item to be cooked and the desired degree of doneness of that meat item whether the desired degree of doneness relates to a range of doneness conditions for a particular meat item or to meat items of different types.

For example, such cooking formula when utilized in connection with gaseous fuel burning cooking apparatus provides the cooking time period in minutes as being equal to seventy times the square root of the weight of the meat item, plus or minus a K factor with the cooking temperature being approximately 325°F and with the K factor being the selected degree of doneness for the particular meat item. For electrically heated cooking apparatus, the cooking formula provides the cooking time period in minutes equal to 40 times the square root of the weight of the meat item plus or minus a K factor for the desired degree of doneness of the particular meat item and the cooking temperature being approximately 325°F.

The results of the above formula is in minutes from the time the cooking apparatus begins to cook the meat item to the time that the meat item is ready to be removed from the oven at the termination or zero position of such completed time period. However, during such cooking operation the high cooking temperature (325°F) is terminated at a set point during the computed cooking time period so that the temperature in the oven, while drifting down from the high cooking temperature to a holding and non-cooking low temperature, will continue to cook the meat item until the oven reaches a hold temperature of the oven, such as 170°F, which occurs at the zero or end of the computed cooking time period. In this manner, the cooked meat will be at the desired degree of doneness so that if the housewife does not remove the cooked meat item at this particular time, the oven will maintain the meat item at a palatable temperature of 170°F or the like which is a non-cooking temperature so that the cooked meat item can be removed from the oven anytime after the elapsed computed cooking time period, such as several hours as the case may be.

For example, it has been found that for gaseous fuel burning ovens, the automatic cutback time for the oven temperature to the end of a computed cooking time period can be approximately 45 minutes whereas for an electrically heated oven such automatic cutback time can be approximately 60 minutes. The K factor of the above formula can be tailored by a particular manufacturer's oven.

In particular, for a gas oven it has been found that if the automatic cutback takes place 45 minutes from the zero position, a roast beef will be properly cooked for a desired doneness for "rare" if the computed cooking time period is seventy times the square root of the weight of the meat item plus 0, the beef roast will be properly cooked for a desired doneness of a middle "medium" if the computed cooking time period is seventy times the square root of the weight of the meat item plus 24 minutes, and the beef roast will be properly cooked for a desired doneness of "well" if the computed cooking time period is 70 times the square root of the weight of the meat item plus 72 minutes. Thus, it can be seen that the K factor can be scaled through such limits for variations of degree of doneness as well as for other meat types.

It is further well known from the copending patent application of Carl J. Goodhouse et al., Ser. No. 112,132, filed Feb. 3, 1971, that a cooking computer of the above type can be provided wherein the housewife need only to manually insert the weight input means of the aforementioned cooking formula into the computer to provide for the computed cooking time period for a particular meat item whereby the operation of such computer by the housewife is a relatively simple operation whereas the computer automatically provides its accurate output function as fully described in the aforementioned copending patent application of James R. Willson.

In particular, one embodiment of the invention of the aforementioned patent application, Ser. No. 112,132, provides a cooking computer for determining the cooking operation of the cooking apparatus, the computer having a stationary input means indicating a selectable variable other than the weight of the meat item, such as the desired degree of doneness and/or meat type. The computer has a manually settable weight input means for indicating a single selected indicated weight applicable to all meat items and corresponding to the weight of the particular meat item to be cooked. The weight input means is set in relation to a visually selected variable of the stationary input means. The computer has a time period output means operatively associated with input means that provides as an output, a cooking time period for the particular meat item computed as a function from the selection of both of the input means where the cooking formula is derived from the aforementioned copending patent application of James R. Willson and fully described above.

However, it has been found, according to the teachings of this invention, that such computer means of the aforementioned copending patent application of Carl J. Goodhouse et al., when utilized to control the operation of a cooking apparatus or when utilized to provide the elapsing time of the computed cooking time period, does not indicate to the housewife what selection she has made for a particular operating computed time period as the initial selection of the settings of the input means as well as the computed cooking time period is continuously being wiped out by the operation of the computer means during the running of the computed cooking time period.

Therefore, it is a feature of this invention to provide a cooking computer means of the above type wherein once a selection has been made of the input means thereof to provide a calculated cooking time period and the computer is being operated for such computed cooking time period, the set input means continuously indicate the selected weight and variable for the particular meat item even after the operation of the time period output means for the computed cooking time period until the input means are utilized for causing the computation of the cooking time period for another meat item where the weight and selected variable are to be different than the particular meat item previously utilized.

Thus, once the particular meat item has been cooked, the housewife then can see the exact cooked condition thereof when the computer has been set for the two variables that she selected so that she can thereafter decide whether the particular meat item has been cooked exactly to the degree of doneness that she expected or whether she should make further adjustments in the setting of the doneness input means to provide for a cooking of the meat item to a more desired condition thereof in the future. Thus, once the housewife has learned the degree of doneness setting she desires for the end result, the cooking apparatus will produce such desired results over and over again regardless of the shape of the meat item, etc., if the housewife makes the input selections she intended to make from experience.

In particular, one embodiment of this invention provides a cooking computer of the above type that is fully described and claimed in the aforementioned copending patent application of Carl J. Goodhouse et al., Ser. No. 112,132, together with operating means for operating the time period output means of the computer for the computed time period when the operating means is activated. Both of the input means are so constructed and arranged that when utilized for computing the cooking time period for a particular meat item, the input means continuously indicate the selected weight and variable for the particular meat item, even after the operation of the time period output means for the computed cooking time period until the input means are again utilized for the computation of a cooking time period for another meat item where the weight and selected variable are to be different from the particular meat item previously cooked.

Accordingly, it is an object of this invention to provide an improved cooking computer means having one or more of the novel features set forth above or hereinafter shown or described.

Another object of this invention is to provide a cooking apparatus utilizing such a cooking computer means or the like.

Other objects, uses, and advantages of this invention are apparent from a reading of this description which proceeds with reference to the accompanying drawings forming a part thereof and wherein:

FIG. 12 is a view similar to FIG. 3 illustrating the structure thereof when set by the cooking computer means in the condition of FIG. 11.

FIG. 13 is a view similar to FIG. 6 with the structure thereof set by the cooking computer means in the condition of FIG. 11.

FIG. 14 is a cross-sectional view taken on the line 14—14 of FIG. 13 and illustrates the structure when in the setting of FIG. 11.

FIG. 15 is a view similar to FIG. 6 and illustrates the cooking computer when the actual time reaches the selected time for the cooking computer means to begin the cooking operation.

FIG. 16 is a view similar to FIG. 11 and illustrates the cooking computer means during the operation of the cooking apparatus for the computed cooking time period.

Figure 1:
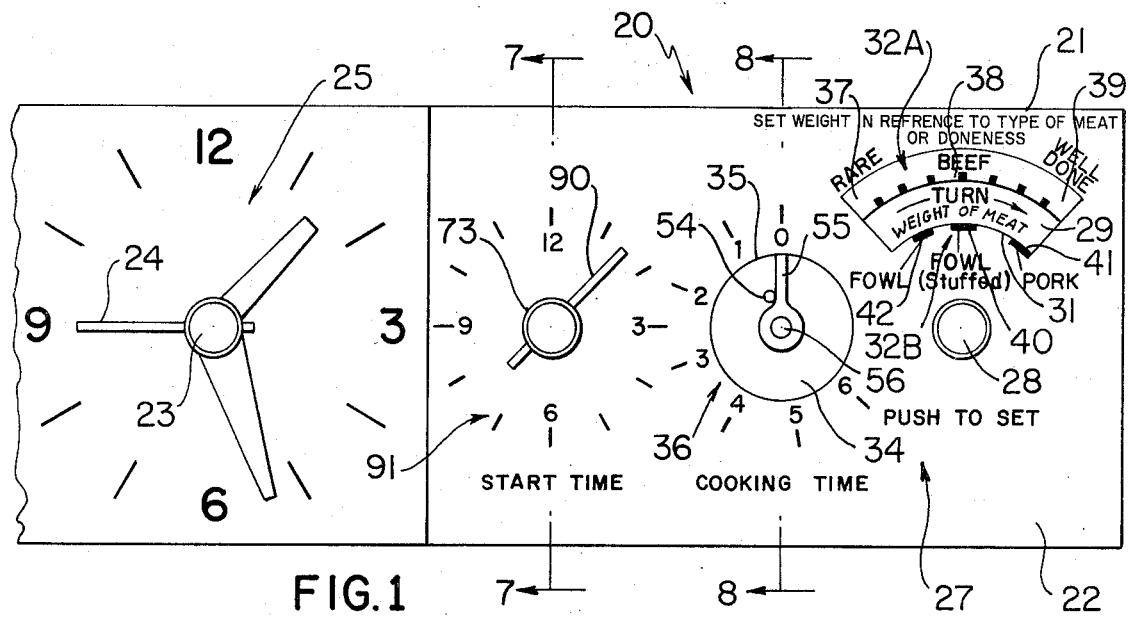
FIG. 1 is a front view of the cooking computer means of this invention before the same has been set for computing the cooking time period for the particular meat item.
Figure 2:
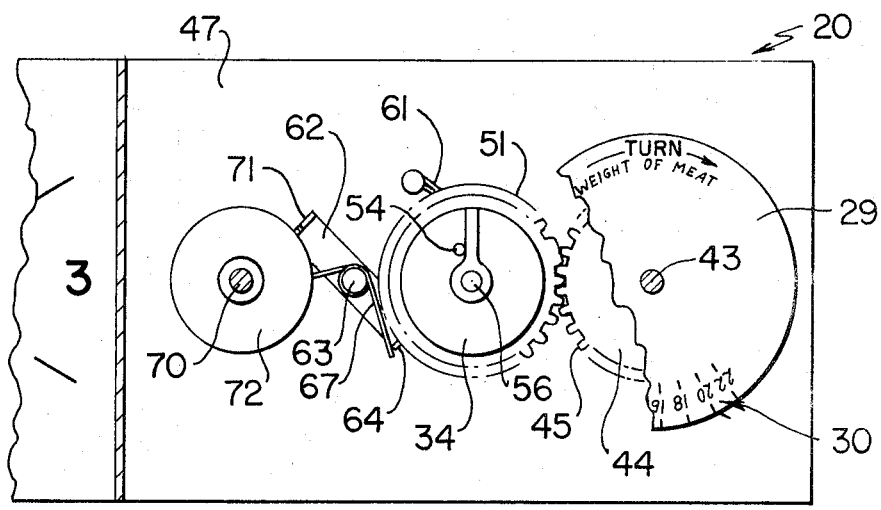
FIG. 2 is a fragmentary front view of the computer of FIG. 1 with part of the control panel thereof removed.

While the various features of this invention are hereinafter described and illustrated as being particularly adaptable for operating with a particular automatic clock arrangement for an oven control, it is to be understand that various features of this invention can be used singly or in any combination thereof to provide cooking computer means for other types of control means or merely by itself for information purposes and the like, if desired.

Therefore, this invention is not to be limited to only the embodiment illustrated in the drawings, because the drawings are merely utilized to illustrate one of the wide variety of uses of this invention.

Referring now to FIG. 1, the cooking computer device of this invention is generally indicated by the reference numeral 20 and comprises a conventional frame structure 21 having a front wall 22 providing a control panel for the cooking computer means 20. The control panel 22 has the conventional bell ringing timer settable knob 23 and timer pointer 24 that does not form any part of this invention. The control knob 23 also is adapted to set a clock means 25 that is conventional in the art except the same is being utilized in combination with a computer portion 27 of the computer means 20 of this invention in a unique manner as will be apparent hereinafter to control a cooking apparatus that is generally indicated by the reference numeral 26 in FIG. 9.

The control device 20 is fully described in the U.S. Pat. No. 3,358,924 and the same therefore need not be described in detail except where necessary to understand the modification thereof to incorporate the inventive features of this invention.

Figure 4:
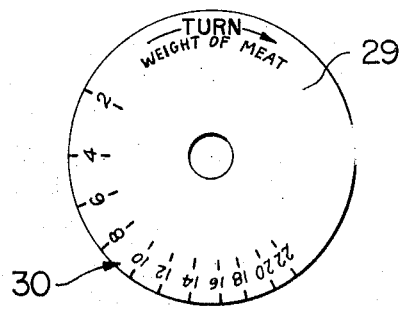
FIG. 4 is a front view of the rotatable scale of the weight input means of the computer means of FIG. 1.

In general, the computer portion 27 of the computer device or means 20 includes a control knob 28 which the housewife can rotate to cause a disc 29, FIGS. 1 and 4, to position a weight scale 30 thereon so as to be viewable through an arcuate window means 31 in the front wall 22. In this manner, the housewife can set a weight input into the computer 27 in relation to a stationary scale or input means 32A and 32B respectively disposed on the control panel 22 on opposite sides of the arcuate window 31 so that a computed cooking time period will be indicated by a reference mark 33, FIG. 10, on a rotatable member 34 being viewable at a circular outlet 35 in the control panel 22 that is positioned adjacent a stationary time scale 36 on the control panel 22 to indicate the computed cooking time period for the selected weight of the meat item as set against the desired increment on the stationary input means 32A or 32B for the desired degree of doneness of the meat item or meat type as will be apparent hereinafter.

The upper stationary scale 32A on the front wall 22 of the computer device 20 is provided for degree of doneness for beef roast and extends from a rare setting 37 through a medium range 38 to a well done setting 39 with the scale 32A being suitably colored from left to right with red hues conforming to the degrees of doneness that the interior of the meat will have for a particular degree of doneness setting against the scale 32A. The lower scale 32B is provided for degree of doneness of other meat types. Since other meat types each are normally cooked to the same degree of doneness for the particular type of meat, the scale 32B includes a single setting 40 for stuffed fowl, a single setting 41 for well done pork, and a single setting 42 for unstuffed fowl. Of course, a range of settings for each different type of meats could be provided, if desired.

As previously stated, the disc 29 that carries the weight scale 30 is rotatable relative to the front wall 22 of the computer device 20 by the control knob 28, the disc 29 being carried on a shaft means 43 to be rotated thereby when the knob 28 is rotated. The shaft means 43 is rotatably mounted to the frame means 21 with the shaft means 43 carrying a disc 44, FIG. 5, having gear teeth 45 disposed completely about the outer periphery thereof. The shaft means 43 and gear 44 thereof are axially movable relative to the frame 21 in a bearing means 46 carried by a back wall plate 47 of the frame means 21 with the shaft means 43 carrying a rear clutch plate 48 adapted to be engaged against a resilient disc 49 carried by the back plate 47 under the force of a leaf spring 50 also carried by the backplate 47 and bearing against the end of the shaft 43. In this manner, the leaf spring 50 normally urges the clutch plate 48 into engagement with the resilient disc 49 to prevent rotation of the shaft 43 and, thus, the gear 44 and weight disc 29 until the operator pushes axially inwardly on the knob 28 to free the clutch plate 48 from the resilient retarder 49 to permit the dial 29 to be set to the selected meat weight in the window 31.

The gear 44 of the shaft means 43 of the weight input knob 28 is disposed in meshing relation with another gear 51 carried by a bushing 52 rotatably mounted on a rotatable shaft 53 rotatably carried by the frame means 21, the bushing 52 being fixed to the rotatable member 34 at the window 35. The plate 39 also carries an outwardly directed stop 54 that is disposed adjacent the reference line 33 as illustrated in FIG. 10 for a purpose hereinafter described.

Therefore, it can be seen that when the knob 28 for the weight input means is axially moved to free the clutch member 48 of the shaft means 43 from the retarder 49, the knob 28 can be rotated to rotate the weight scale or disc 29 relative to the window 31 so that the desired weight on the scale 30 can be positioned against the desired stationary reference on the scale 32A or 32B and the gear 51 will be rotated in unison with the gear 44 to position the reference line 33 on the rotatable member 34 relative to the time scale 36 to indicate the computed cooking time period for the particular weight setting relative to the particular stationary scale setting at the input means 28 with such computed time periods being provided in accordance with the aforementioned cooking formula.

Figure 10:
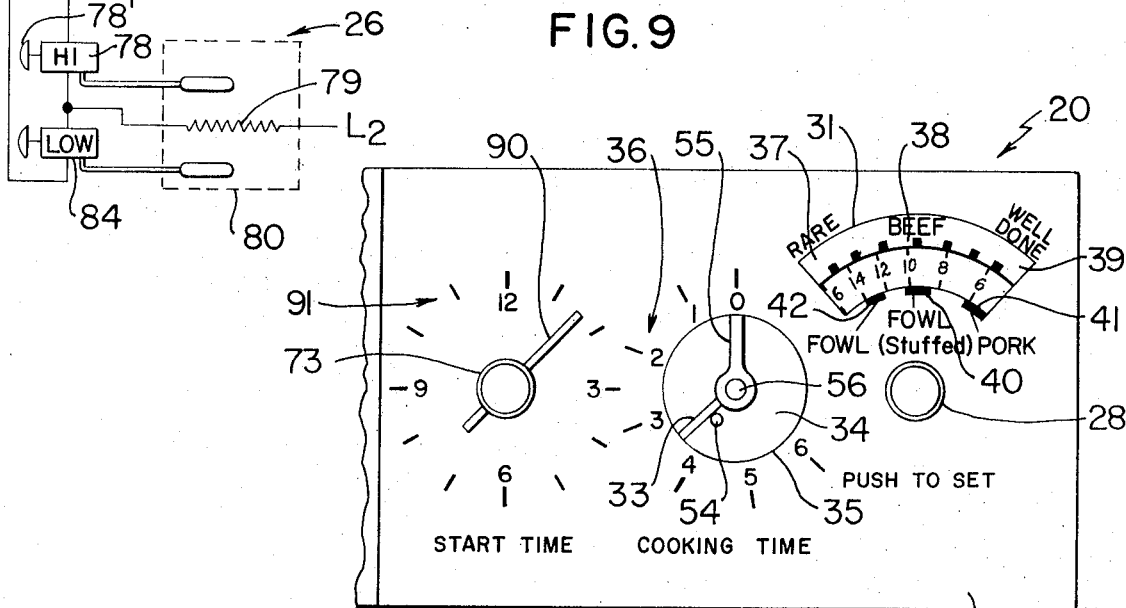
FIG. 10 is a fragmentary front view of the computer means and illustrates the cooking computer means having been set for a particular meat item.

For example, when the knob 28 is moved from the position illustrated in FIG. 1 to the position illustrated in FIG. 10, so as to compute the cooking time period for a beef roast of a weight of 9 lbs. at a medium setting, the plate 34 will have been rotated so that the reference line 33 will indicate that the computed cooking time period is 3½ hours computed by the cooking time formula of 70 times the square root of the weight of the meat item plus a certain amount for the K factor for the total cooking time with an automatic cutback of cooking temperature 45 minutes from the end of the cooking time period. Thus, the temperature of the oven can drift down from the normal cooking temperature of 325°F to 170°F for the reasons set forth in the aforementioned copending patent application before the end of the computed cooking time period.

The discs or dials 29 and 34 are held in the selected positions thereof by the leaf spring 50 forcing the clutch plate 48 into clutching engagement with the stationary resilient arrestor 49 so that the same will remain in such positions until the knob 29 again releases the clutch plate 48 to set the dial 29 in another position thereof.

The shaft 53 on which the dial 34 is rotatably mounted is interconnected to a pointer 55 at the end 56 thereof that projects out through the disc 34 so as to position the pointer 55 in front of the disc 34 as illustrated in FIG. 1. The shaft 53 also carries a pair of spaced disc members 56 that are fastened thereto and have a hub portion 58 interconnected to the inner end 59 of a coiled spring coiled between the discs 56 and having its outer end 61 fastened to the backplate 47. The force of the coiled spring 60 tends to rotate the discs 56 and, thus, the shaft 53 in a counterclockwise direction when viewing the shaft 53 in FIGS. 1 and 3. However, a rotatable stop member 62 is rotatably mounted to the back plate 47 on a pivot means 63 and has a tang 64 normally urged into notches 65 of the discs 56 to engage against shoulders 66 thereof to prevent rotation of the discs 56 from the position illustrated in FIGS. 1 and 3. The latching direction of rotation of the latch member 62 is provided by a hairpin spring 67 having one end 68 bearing against the tang 64 and the other end 69 thereof engaging against another shaft means 70 carried by the same means 21.

Figure 3:
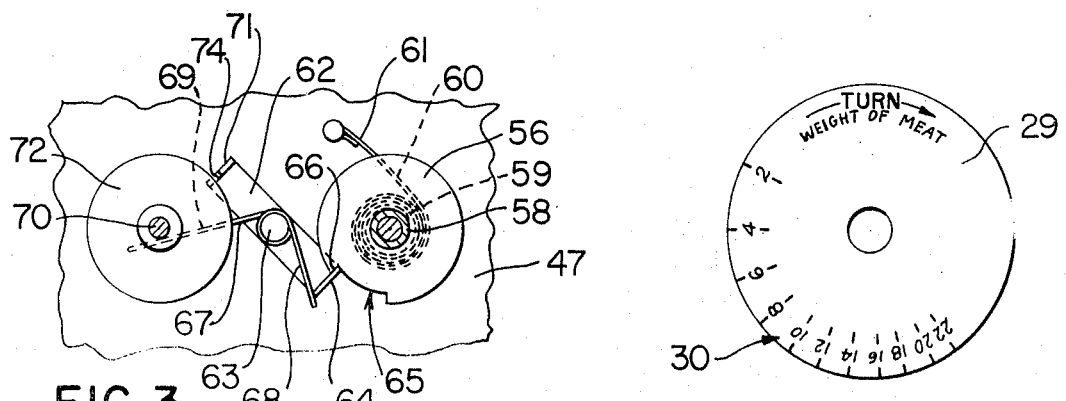
FIG. 3 is a view similar to FIG. 2 with certain other parts thereof removed to illustrate background structure.

The latch member 62 also has an angled cam tang 71 on the end thereof opposite from the latching tang 64 which is adapted to be engaged by a cam disc 72 carried on the shaft 70 so that when the shaft 70 is axially moved rearwardly by a knob 73 carried by the shaft 70 for a purpose hereinafter described, the outer periphery of the disc 72 operates against the angled surface 74 of the cam tang 71 to cause the latching member 62 to rotate in a clockwise direction in FIG. 3 in opposition to the force of the hairpin spring 67 and clear the latching tang 64 thereof from the notches 65 so that the coiled spring 60 is now free to rotate the discs 56 and, thus, the shaft 56 in a counterclockwise direction until the pointer 55 carried thereby engages against the stop pin 54 of the disc 34 such as illustrated in FIG. 10 for a purpose hereinafter described.

Figures 7, 8:
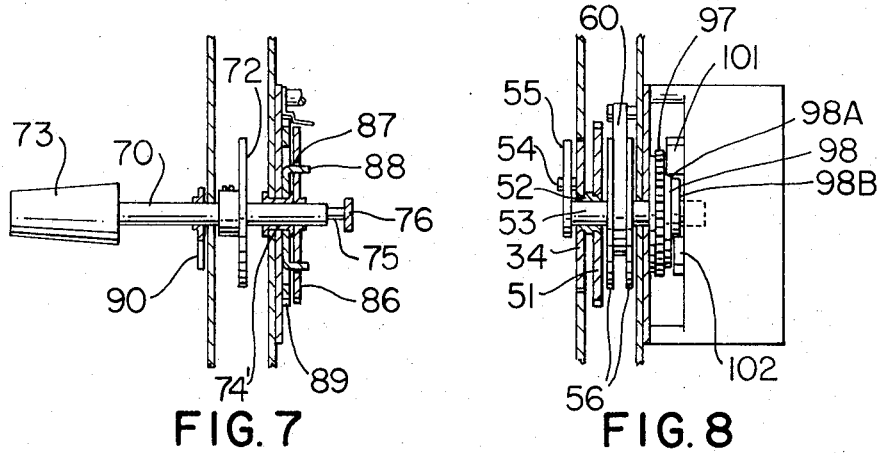
FIG. 7 is a fragmentary, cross-sectional view taken on line 7—7 of FIG. 1.
FIG. 8 is a fragmentary, cross-sectional view taken on line 8—8 of FIG. 1.

The shaft 70 is rotatably mounted to the frame 21 by a suitable bearing 74 in the backplate 47 of the frame means 21 and is adapted to be axially movable thereto, the shaft 70 having an end 75 engagable against a switch actuator or lever 76 of an electrical switch means 77 that is spring urged to normally maintain the shaft 70 in the out axial position illustrated in FIG. 7. The lever 76 operates the switch 77 in such a manner that when the arm 76 of the switch 77 is disposed in the position illustrated in FIG. 5 a suitable control means 78 is adapted to interconnect power source leads L1 and L2 across a heater element 79 for the oven 80 of the cooking apparatus 26 as illustrated in FIG. 9.

Figure 5:
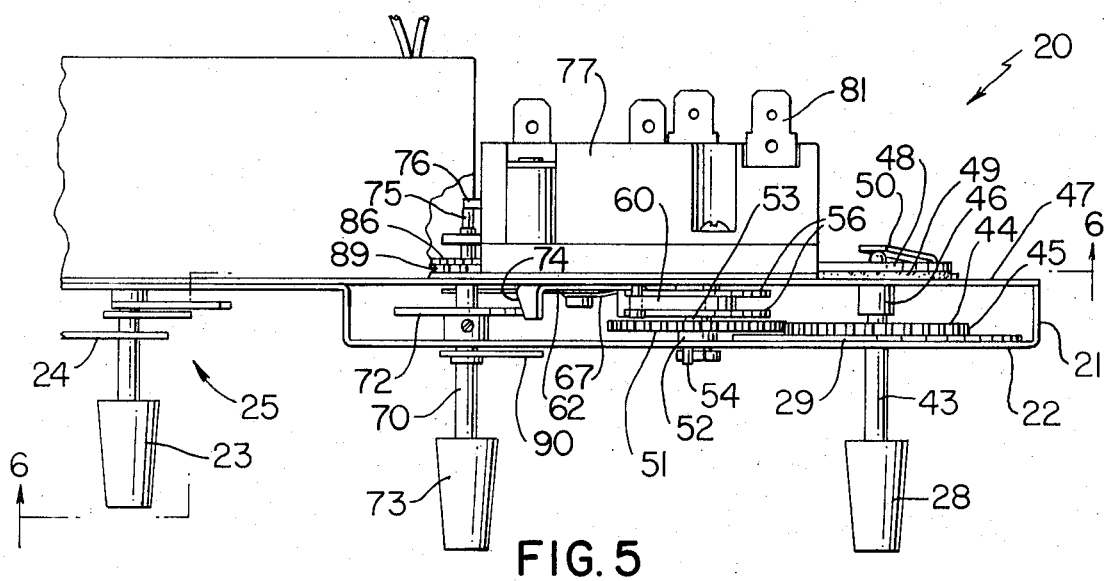
FIG. 5 is a top view of the computer means of FIG. 1.
Figure 9:
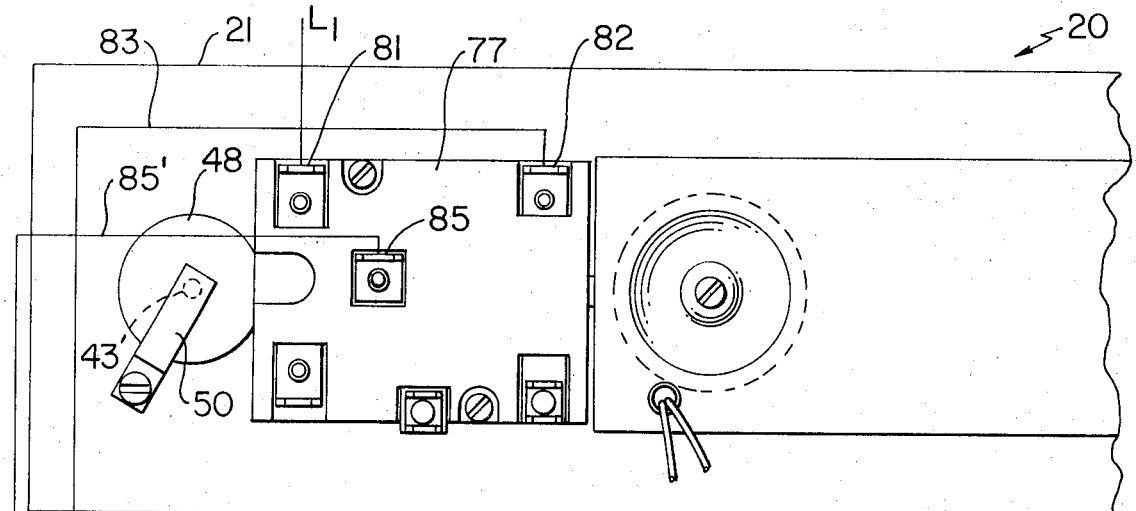
FIG. 9 is a back view of the cooking computer means of FIG. 1 and schematically illustrates the control system and cooking apparatus utilizing the same.

As illustrated in FIG. 9, the control device 78 is utilized to control the electrical heater element 79 in the oven 80 to maintain the temperature in the oven 80 at the cooking temperature setting of the control 78 through its control knob 78' in a manner well known in the art and as set forth in the aforementioned U.S. Pat. No. 3,358,924. The switch 77 of the control device 20 has a power source lead L1 interconnected to a terminal 81 thereof and has internal switching mechanism to interconnect the terminal 81 to the terminal 82 that leads to the control device 78 by a lead 83 only when the switch lever 76 is in its out position as illustrated in FIG. 5. Thus, the lever 76 must be in the position illustrated in FIG. 5 with the shaft 70 in its out position in order for the switch 77 to permit the control device 78 to interconnect the heating element 79 across the power source leads L1 and L2 for heating the oven 80.

Another control device 84 is provided for the oven 80 and is utilized for automatically controlling the heating element 79 to provide the low noncooking and warmth retaining temperature of 170°F. within the oven 80 when the remaining 45 minute cut-back time is reached in the automatic cooking operation as will be apparent hereinafter, the thermostat 84 being interconnected by a lead 85' to a terminal 85 of the switch 77 that has another internal switch means thereof that is adapted to switch the termianl 81 from the terminal 82 to the terminal 85 only when the cut-back temperature time is reached as will be apparent hereinafter.

Such internal switching for the switch 77 is also disclosed and described in the aforementioned U.S. Pat. No. 3,358,924 whereby further details thereof need not be presented herein because such patent is incorporated herein by reference for the details of the switch device 77 as well as for details and operation of the other structure of the device 20. Thus, it is only necessary to state that the switch 77 is adapted to connect the power source lead L1 to the control device 78 to cause the operation of the oven 80 for a cooking operation thereof at 325°F. when it is time for the oven 80 to be operated to cook a particular meat item and then 45 minutes before the computed cooking time period has been reached, the switch means 77 will discontinue the operation of the control device 78 and cause the operation of the control device 84 for interconnecting the power source lead L2 thereto so that the temperature in the oven 80 will drift down from the cooking temperature of 325°F. to approximately 170°F. for no further cooking of the meat item when the computed cooking time period reaches its termination or zero position. Of course, the thermostatic device 84 will tend to maintain the temperature in the oven 80 at the 170°F. after the computed cooking time period has elapsed so that the housewife can subsequently remove the cooked meat item from the oven 80 at any desired time after the completed computed cooking time period for the reasons previously set forth.

When the other switch within the switch 77 is in the closed position, the control means 78 is adapted to interconnect the power source leads L1 and L2 to the heater means 79 only when the switch knob 76 is in the down position illustrated in FIG. 5. However, when the other switch for the terminals 81 and 82 is in the open position, no current can be supplied through the switch 77 to the heater means 79.

Axial movement of the shaft 70 by the knob 73 in an up direction in FIG. 5 in opposition to the force of the spring means of the switch arm or lever 76 will cause a gear member 86 fixed on the shaft 70 to have slots 87 thereof clear cooperating drive tangs 88 on another gear member 89 which is journaled on the journal 74' so as to disconnect the drive tangs 88 of the drive gear 89 from the shaft gear 86 in the manner illustrated in FIG. 14. With the gear 86 moved out of driving relation with the drive tangs 88, the knob 73 can be rotated to rotatably move the slots 87 of the gear 86 out of registry with the drive tangs 88 and such rotational movement of the knob 73 and shaft 70 causes a timer pointer 90 thereof to be moved relative to a time scale 91 on the control panel 22 to indicate at what time the control means 20 is to operate the heater means 79 of the cooking apparatus 26 for a computed time cooking operation thereof as will be apparent hereinafter.

Figure 6:
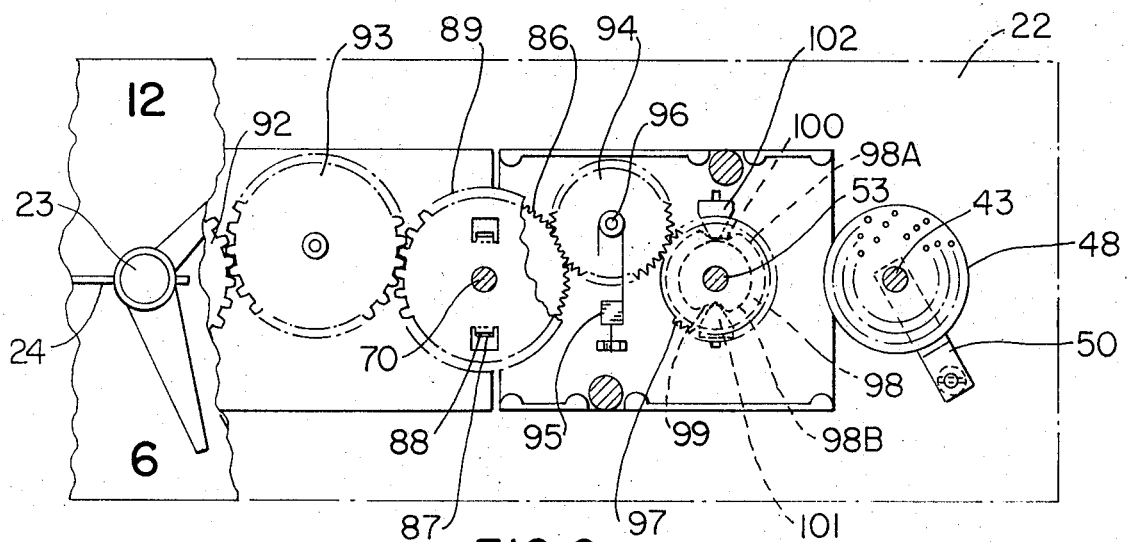
FIG. 6 is a front view similar to FIG. 1 with certain structure of the computer removed to illustrate background structure.

For example, the clock motor (not shown) that operates the hands of the actual clock 25, has a drive gear 92, FIG. 6, that is interconnected by an intermediate gear 93 to the drive gear 89 previously described to continuously rotate the gear 89 and as long as the gear 86 of the shaft 70 is disposed in the position illustrated in FIG. 7 wherein the drive tangs 88 of the drive gear 89 are meshing in the slots 87 of the shaft gear 86, the shaft 70 will rotate in unison therewith and the pointer 90 will indicate the actual time on its time scale 91 that is on the clock 25.

The shaft gear 86 is normally disposed in meshing relation with an idler gear 94 which is normally urged into such meshing relation by a tension spring 95 because the shaft means 96 of the idler gear 94 is adapted to move upwardly in opposition to the force of the spring 95 to permit the drive gear 86 to move axially thereto and intermesh therewith. The idler gear 94 is only adapted to be disposed in meshing relation with the gear 86 when the gear 86 is disposed in the position illustrated in FIG. 7. However, when the gear 86 is axially moved relative to the frame 21 to the position illustrated in FIG. 14 for a purpose hereinafter described, the gear 86 is disposed out of meshing relation with the gear 94.

A gear member 97 is carried by the shaft 53 to the rear of the rear frame plate 47 in the manner illustrated in FIGS. 6 and 8 with such gear 97 being disposed in meshing relation with the idler gear 94. A cam member 98 is also fixedly disposed on the shaft 53 to the rear of the gear 97 and the same is provided with a pair of opposed cam recesses 99 and 100 respectively adapted to register with a pair of switch plungers 101 and 102, one 102 of which operates the switch means 77 in such a manner that only when the plunger 102 is in its innermost position as illustrated in FIG. 6, will the switch 77 be adapted to interconnect the terminal 81 with the terminal 85 to cause the controller 84 to maintain the temperature in the oven for the cooking apparatus 26 at the non-cooking and warmth retaining temperature of 170°F. for a purpose hereinafter described.

The operation of the cooking computer means 20 of this invention for controlling the heater means 79 for the cooking apparatus 26 will now be described.

Assuming that at approximately 1:30 in the afternoon the cooking computer means 20 is the condition illustrated in FIG. 1 and the housewife has determined that she wants to cook a 9 pound beef roast with a medium degree of doneness to be served at approximately 7:30 or relatively soon thereafter.

The housewife first pushes in on the knob 28 of the computer portion 27 of the device 20 and turns the knob 28 in a clockwise direction from the position illustrated in FIG. 1 to the position illustrated in FIG. 10 where the 9 pound weight on the scale 30 substantially registers with the desired medium portion of the degree of doneness scale 32A for beef. Such inward pushing on the knob 28 to permit the rotation of the dial 29 to the position illustrated in FIG. 10 clears the clutch plate 48 in opposition to the force of the leaf spring 50 and such rotation of the dial 29 causes, through the intermeshing of the gear 44 with the gear 51, rotation of the plate 34 to the position illustrated in FIG. 10 where it can be seen that the reference line 33 thereon now states that in order to cook the 9 pound beef roast to the selected medium condition, the cooking time will be 3½ hours with such 3½ hours having been determined by the aforementioned cooking formula.

When the housewife lets go of the knob 28, the force of the leaf spring 50 drives the clutch plate 48 into locking relation with the resilient member 49 so that the setting of the dial 29 and the reference line 33 illustrating the computed cooking time period will remain stationary thereafter until the knob 29 is again depressed and the dial 29 turned to another position thereof as will be apparent hereinafter.

From the above setting of the computer portion 27 of the computer means 20 and if the housewife desires to have the roast completed by approximately 7:30, she knows that the oven must start cooking the roast at 4:00.

Figure 11:
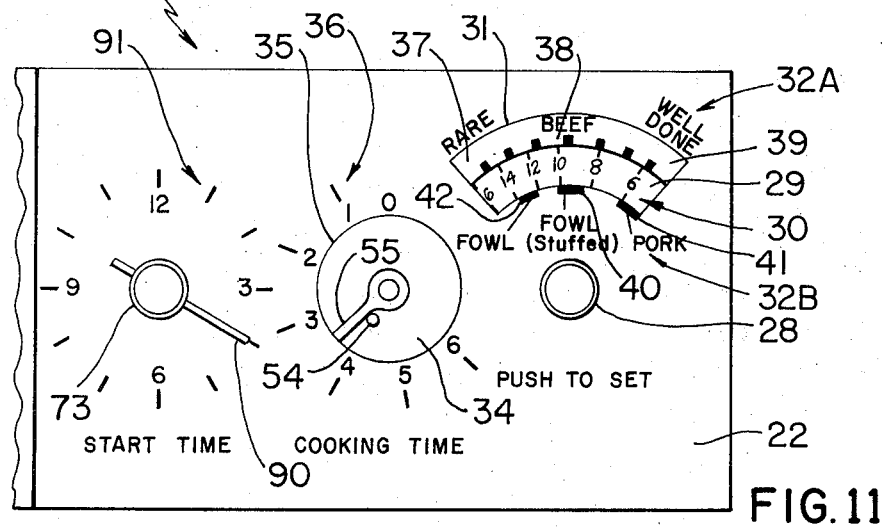
FIG. 11 is a view similar to FIG. 10 and illustrates the cooking computer means having been set to operate the cooking apparatus to cook the meat item for the computed cooking time period when the actual time reaches a selected time.

Therefore, the housewife pushes in on the knob 73 to cause the gear member 86 thereof to clear the drive tangs 88 and with such shaft 70 moved inwardly, the housewife then can turn the shaft 70 so that the pointer 90 thereof will point to 4:00 start cooking time on the scale 91 as illustrated in FIG. 11 whereby the gear 89 means of the clock 25 will not have its drive tangs 88 come into registry with the slots 87 of the gear 86 until 4:00 is indicated on the clock 25. Thus, the shaft 70 is now held in its inward position by the tangs 88 preventing the gear 86 from moving the shaft 70 back to its out position so that the switch lever 76 for the switch 77 is in a position to prevent the switch 77 from interconnecting the power source lead L1 to the heater 79 for the oven 80 of the cooking apparatus 26. Such initial inward movement of the shaft 70 also caused the cam plate 72 thereon to cam on the arm 71 of the latch member 62 and cause the same to rotate in a clockwise direction and have its latch tang 64 clear the shoulders 66 of the members 56 carried by the shaft 53. The unlatched shaft 53 now rotates in a counterclockwise direction in FIG. 3 under the force of the spring 60 to not only cause the pointer 55 thereof to engage against the stop pin 54 on the member 34 as illustrated in FIG. 11, but also to cause the cam lobes 98A and 98B on the member 98 to cam outwardly the switch plungers 101 and 102 to the position illustrated in FIG. 13. The switch 77 is now set ao that when the arm 76 is adapted to return to the position illustrated in FIG. 5, the flow of current through the switch 77 will be such that the same will cause the controller 78 to operate the heater 79 to tend to maintain the cooking temperature of 325°F. in the oven 80 of the cooking apparatus 26 until the switch 77, through the member 102, terminates the cooking operation. At this time the oven drifts down to the non-cooking temperature of 170°F. under the control of controller 84 which will maintain temperature in the oven at the warmth retaining and non-cooking temperature of 170°F. until the control devices 78 and 84 are turned to the noncomputer position thereof.

Thus, with the start knob having its pointer 90 disposed at the 4:00 position illustrated in FIG. 10, the clock drive gear 92 continues to rotate the gears 93 and the drive gear 89 in the manner illustrated in FIG. 13 until the drive tangs 88 at 4:00 are brought into registry with the slots 87 of the gear 86 as illustrated in FIG. 7 whereby the force of the plunger 76 moves the shaft 70 axially outwardly and interlocks the gear 86 with the gear 89 so that same now will rotate in unison with the drive gear 92 of the clock 25. Of course, this situation occurs at 4:00 whereby the arm 76 now causes the switch 77 to begin to operate the heating means 79 to tend to maintain the temperaure in the oven 80 at the cooking temperature of 325°F. The movement of the gear 86 back into locking engagement with the gear 89 also places the gear 86 in meshing relation with the idler gear 94 so that further rotation of the gear 86 from the 4:00 position thereof causes the idler gear 94 to drive the gear 97 and, thus, the shaft 53 in opposition to the force of the coiled spring 60 to wind up the coil spring 60 and also move the pointer 55 from its 3½ hour cooking position back toward the zero position as illustrated in FIG. 16 to continuously illustrate the elapsing time of the cooking time period as the meat is being cooked in the oven.

The recesses 99 and 100 on the member 98 respectively register with the plungers 101 and 102 with about 45 minutes of the computed cooking time period yet to run before the pointer 55 reaches the zero position whereby the switch 77 terminates the normal cooking operation of the heating means 79 and causes the temperature in the oven to drift downwardly to approximately 170°F and thereafter maintain such temperature in the oven at 170°F by cycling on and off the heater means 79 in a manner well known in the art.

When the pointer 55 reaches the zero position as illustrated in FIG. 1, even though the cooking apparatus 26 has now cooked the particular meat item for 3½ hours in the manner previously described, the input means 29 of the computer portion 27 of the device 20 still indicates that a 9-pound roast has been selected to be cooked at a medium degree of doneness and that the amount of time that the roast was cooked was 3½ hours. Thus, should the housewife when subsequently removing the cooked roast from the oven 80 and cutting into the same find that she would like the roast to actually be rarer in the future, she can see that she should have placed the weight on the scale 30 more toward the rarer side of the medium portion of the scale 32A rather than toward the well-done side thereof.

Thus, thereafter, her beef roasts will be done to the exact degree of doneness that she prefers through the now proper selection of the degree of doneness.

This will be true even though the particular weight of a particular beef roast will be different from 9 pounds, such as 12 pounds, because she will place the 12 pound weight setting of the dial 29 adjacent the particular line of degree of doneness that she desires to produce the cooked meat as the cooking formula takes care of the complicated square root problem and cut-back temperature problem.

Therefore, it can be seen that this invention provides an improved cooking computer as well as a cooking apparatus utilizing such a cooking computer or the like.

While the form of the invention now preferred has been disclosed as required by the patent statutes, other forms may be utilized all coming within the scope of the appended claims.

What is claimed is:

1. A cooking computer for determining the cooking operation of a cooking apparatus, said computer having a stationary input means indicating selectable variables other than the weight of a meat item, said computer having a manually settable weight input means for indicating a single selected indicated weight applicable to all meat items and corresponding to the weight of a particular meat item to be cooked, said weight input means being settable in relation to a selected variable of said stationary input means, said computer having a time period output means operatively associated with both of said input means to provide as an output a cooking time period for said particular meat item computed as a function from the selection of both of said input means, said computer having operating means for operating said time period output means for said computed cooking time period when said operating means is activated, both of said input means being so constructed and arranged that when utilized for the computing of said cooking time period for said particular meat item, both of said input means continuously indicate the selected weight and variable for said particular meat item even after the operation of said time period output means for said computed cooking time period until said input means are utilized for causing the computation of a cooking time period for another meat item where the weight and selected variable are to be different from said particular meat item.

2. A cooking computer as set forth in claim 1 wherein said computer has means visually indicating said computed cooking time period.

3. A cooking computer as set forth in claim 1 wherein said stationary input means indicates a variable of meat cooking doneness.

4. A cooking computer as set forth in claim 1 wherein said stationary input means indicates a variable of meat type.

5. A cooking computer as set forth in claim 1 wherein said stationary input means indicates a variable of meat cooking doneness and a variable of meat type.

6. A cooking computer as set forth in claim 1 wherein said stationary input means comprises a stationary scale, said weight input means comprising a movable scale adjacent said stationary scale to be selectably alignable therewith.

7. A cooking computer as set forth in claim 1 wherein said time period output means comprises means for visually indicating said computed cooking time period.

8. A cooking computer as set forth in claim 7 wherein said means for visually indicating said computed cooking time period has means for indicating elapsing time during the running of said computed cooking time period.

9. A cooking computer as set forth in claim 8 wherein said means for visually indicating said computed cooking time period has means for continuously indicating said computed cooking time period even after the operation of said time period output means for said computed cooking time period until said input means are utilized for causing the computation of a cooking time period for another meat item where the weight and selected variable are to be different from said particular meat item.

10. A cooking computer as set forth in claim 9 wherein said means for continuously indicating said computed cooking time period comprises a rotatable plate having a reference indicator thereon for being located adjacent a stationary time scale, said means indicating elapsing time comprising a pointer movable relative to said plate adjacent said stationary time scale.

* * * * *